(12) United States Patent
Yang

(10) Patent No.: US 9,377,830 B2
(45) Date of Patent: Jun. 28, 2016

(54) DATA PROCESSING DEVICE WITH POWER MANAGEMENT UNIT AND PORTABLE DEVICE HAVING THE SAME

(71) Applicant: Samsung Electronics Co., Ltd., Suwon-Si, Gyeonggi-Do (KR)

(72) Inventor: Se-hyun Yang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 471 days.

(21) Appl. No.: 13/726,914

(22) Filed: Dec. 26, 2012

(65) Prior Publication Data

US 2013/0173938 A1    Jul. 4, 2013

Related U.S. Application Data

(60) Provisional application No. 61/581,715, filed on Dec. 30, 2011.

(30) Foreign Application Priority Data

Apr. 4, 2012    (KR) .................. 10-2012-0034949

(51) Int. Cl.
*G06F 1/26* (2006.01)
*G06F 1/20* (2006.01)
*G06F 1/32* (2006.01)

(52) U.S. Cl.
CPC ........ *G06F 1/26* (2013.01); *G06F 1/206* (2013.01); *G06F 1/3287* (2013.01); *Y02B 60/1275* (2013.01); *Y02B 60/1282* (2013.01)

(58) Field of Classification Search
CPC ..................... G06F 1/206; Y02B 60/1275
See application file for complete search history.

(56) References Cited

U.S. PATENT DOCUMENTS

| 5,230,074 A | * | 7/1993 | Canova et al. .................. 714/14 |
| 7,520,669 B2 | | 4/2009 | Yazawa et al. |

(Continued)

FOREIGN PATENT DOCUMENTS

| JP | 2005135350 A | 5/2005 |
| JP | 2008097280 A | 4/2008 |

(Continued)

OTHER PUBLICATIONS

Chiueh, Hering, J. Draper, and J. Choma. "A Dynamic Thermal Management Circuit for System-on-chip Designs." ICECS 2001. 8th IEEE International Conference on Electronics, Circuits and Systems (Cat. No. 01EX483) vol. 2 (2001): 577-80. Accessed Aug. 13, 2015. doi:10.1109/ICECS.2001.957542.*

*Primary Examiner* — Kim Huynh
*Assistant Examiner* — Joshua Neveln
(74) *Attorney, Agent, or Firm* — Harness, Dickey & Pierce, P.L.C.

(57) ABSTRACT

A data processing device includes a plurality of central processing unit (CPU) cores; a plurality of first switches connected between a power line and each of the plurality of CPU cores, respectively; a power management unit; and a dynamic voltage/frequency scaling control circuit configured to scale at least one of a voltage and a frequency of a clock signal which are supplied to each of the CPU cores according to a control of the power management unit, wherein the power management unit is configured to decrease at least one of the voltage and the frequency which are supplied to each of the CPU cores and generate each of first control signals controlling a switching operation of each of the plurality of first switches, according to a control of one of the CPU cores.

9 Claims, 12 Drawing Sheets

(56) References Cited

U.S. PATENT DOCUMENTS

| | | | |
|---|---|---|---|
| 2002/0194402 A1* | 12/2002 | Kung et al. ............... | 710/48 |
| 2005/0114061 A1* | 5/2005 | Gauthier et al. ............ | 702/99 |
| 2006/0101299 A1 | 5/2006 | Chung | |
| 2008/0022140 A1* | 1/2008 | Yamada ............... | G06F 1/206 |
| | | | 713/322 |
| 2010/0073068 A1* | 3/2010 | Cho et al. .................. | 327/513 |
| 2011/0113270 A1 | 5/2011 | Carter et al. | |

FOREIGN PATENT DOCUMENTS

| | | |
|---|---|---|
| JP | 2009037335 A | 2/2009 |
| JP | 2009193536 A | 8/2009 |
| KR | 20060128562 A | 12/2006 |
| KR | 20090086866 A | 8/2009 |
| KR | 20110006505 A | 1/2011 |
| KR | 20110037871 A | 4/2011 |
| KR | 20110045601 A | 5/2011 |

* cited by examiner

DATA PROCESSING DEVICE WITH POWER MANAGEMENT UNIT AND PORTABLE DEVICE HAVING THE SAME

CROSS-REFERENCE TO RELATED APPLICATIONS

This application claims the priority benefit of U.S. provisional patent application No. 61/581,715 filed on Dec. 30, 2011 and the priority benefit under 35 U.S.C. §119 (a) from Korean Patent Application No. 10-2012-0034949 filed on Apr. 4, 2012, the disclosures of each of which are hereby incorporated by reference in their entirety.

BACKGROUND

Embodiments of the present inventive concepts relate to a technology controlling power consumption of an integrated circuit (IC), and more particularly, to devices which may control power consumption of the IC.

Recently, as a portable device such as a smart phone or a tablet PC has been widely spread and applications which may be used in the portable device increase, various methods for reducing power consumed in the portable device are required. In addition, a recent portable device needs to satisfy both a demand for reducing power consumption and a demand for retaining high performance at the same time required to increase battery retention time.

SUMMARY

An embodiment of the present inventive concepts is directed to a method for controlling power consumption of a cache memory, including defining a cache memory as a plurality of portions, and controlling whether to supply a voltage to each of the plurality of portions in response to each of control signals. The plurality of portions may be defined by using a programmable memory.

According to an example embodiment, the controlling may control by using each of switches which are included in the cache memory and operate in response to each of the control signals. The cache memory is a L2 cache memory. According to another example embodiment, the controlling may control by using each of switches which are embodied outside the cache memory and operate in response to each of the control signals. The cache memory is a L1 cache memory.

The method may further include analyzing each operation of the plurality of portions in a CPU and generating analysis signals, and generating the control signals based on the analysis signals in a power management unit.

Another example embodiment of the present inventive concepts is directed to a method for controlling power consumption in a processor including cores, including decreasing successively at least one of a clock frequency and a voltage which are supplied to each of the cores, and controlling whether to supply the voltage to each of the cores in response to each of control signals.

The voltage supplied to each of the cores may be intercepted one-at-a-time based on data stored in a programmable memory.

The method may further include analyzing at least one of a workload and a thermal status of each of the cores in one of the cores and generating analysis signals, and generating the control signals based on the analysis signals in a power management unit. The decreasing is performed until the at least one reaches at least one standard.

An example embodiment of the present inventive concepts is directed to a method for controlling temperature, including analyzing thermal data output from thermal sensors and generating analysis data, generating an interrupt signal based on the analysis data, interrupting a voltage supplied to at least one target power domain in response to the interrupt signal or adjusting at least one of the voltage and a frequency which are supplied to the at least one target power domain according to a control of the CPU operating in response to the interrupt signal.

An example embodiment of the present inventive concepts is directed to a processor, including a central processing unit (CPU), a first cache memory performing data communication with the CPU, and a power management unit generating first control signals according to a control of the CPU. The first cache memory includes first switches each connected between a first power line and each of the plurality of first portions, and each of the first switches is switched in response to each of the first control signals.

The CPU includes a second cache memory including a plurality of second portions and second switches each connected between a second power line and each of the plurality of second portions. Each of the second switches is switched in response to each of the second control signals, and the power management unit generates the second control signals according to a control of the CPU.

The power management unit includes a programmable memory for defining each of the plurality of first portions. A portable device according to an example embodiment of the present inventive concepts includes the processor and a display for displaying data processed by the processor.

An example embodiment of the present inventive concepts is directed to a data processing device, including CPU cores, first switches each connected between a power line and each of the CPU cores, a power management unit, a dynamic voltage/frequency scaling control circuit scaling at least one of a voltage and a frequency which are supplied to each of the CPU cores according to a control of the power management unit. The power management unit decreases at least one of the voltage and the frequency which are supplied to each of the CPU cores according to a control of one of the CPU cores, and then generates each of first control signals controlling a switching operation of each of the first switches.

According to an example embodiment, the dynamic voltage/frequency scaling control circuit includes a clock management unit controlling the frequency according to a control of the power management unit and a voltage regulator regulating the voltage according to a control of the power management unit. The clock management unit and the voltage regulator are embodied in one chip.

According to another example embodiment, the dynamic voltage/frequency scaling control circuit includes a clock management unit controlling the frequency according to a control of the power management unit and a voltage generation circuit controlling the voltage according to a control of the power management unit. The clock management unit and the voltage generation circuit are embodied in different chips.

The data processing device further includes an L2 cache memory executing a data communication with at least one of the CPU cores. The power management unit generates second control signals according to a control of one of the CPU cores, and the L2 cache memory includes a plurality of first portions and second switches each connected between a power line and each of the plurality of first portions. Each of the second switches is switched in response to each of the second control signals.

An example embodiment of the present inventive concepts is directed to a processor, including a thermal management unit analyzing thermal data output from thermal sensors and generating analysis data, an interrupt controller generating an interrupt signal based on the analysis data, a power management unit generating a first voltage control signal in response to the interrupt signal, and a voltage supply circuit immediately interrupting a voltage supplied to at least one target power domain in response to the first voltage control signal.

The processor further includes a CPU generating a scaling command in response to the interrupt signal and a clock management unit generating a clock signal. The power management unit generates a second voltage control signal and a clock control signal in response to the scaling command, the voltage supply circuit decreases the voltage in response to the second voltage control signal, and the clock management unit decreases a frequency of the clock signal in response to the clock control signal.

An example embodiment of the inventive concepts is directed to a data processing system comprising a memory cell array including a plurality of memory portions; a plurality of switches corresponding, respectively, to the plurality of memory portions, each of the plurality of switches being electrically connected in between a voltage source and the corresponding memory portion; and a power management unit configured to selectively generate a plurality of control signals for the plurality of switches, respectively, to individually control a supply of voltage from the voltage source to the plurality of memory portions.

The data processing system may further comprise a central processing unit (CPU) configured to analyze operation states of the plurality of memory portions, and to generate power control data based on the analysis, the power management unit being configured to selectively generate the plurality of control signals based on the power control data.

The CPU may be configured to analyze the operation states of the plurality of memory portions by analyzing, for each of the plurality of memory portions, at least one of a workload and temperature of the memory portion.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
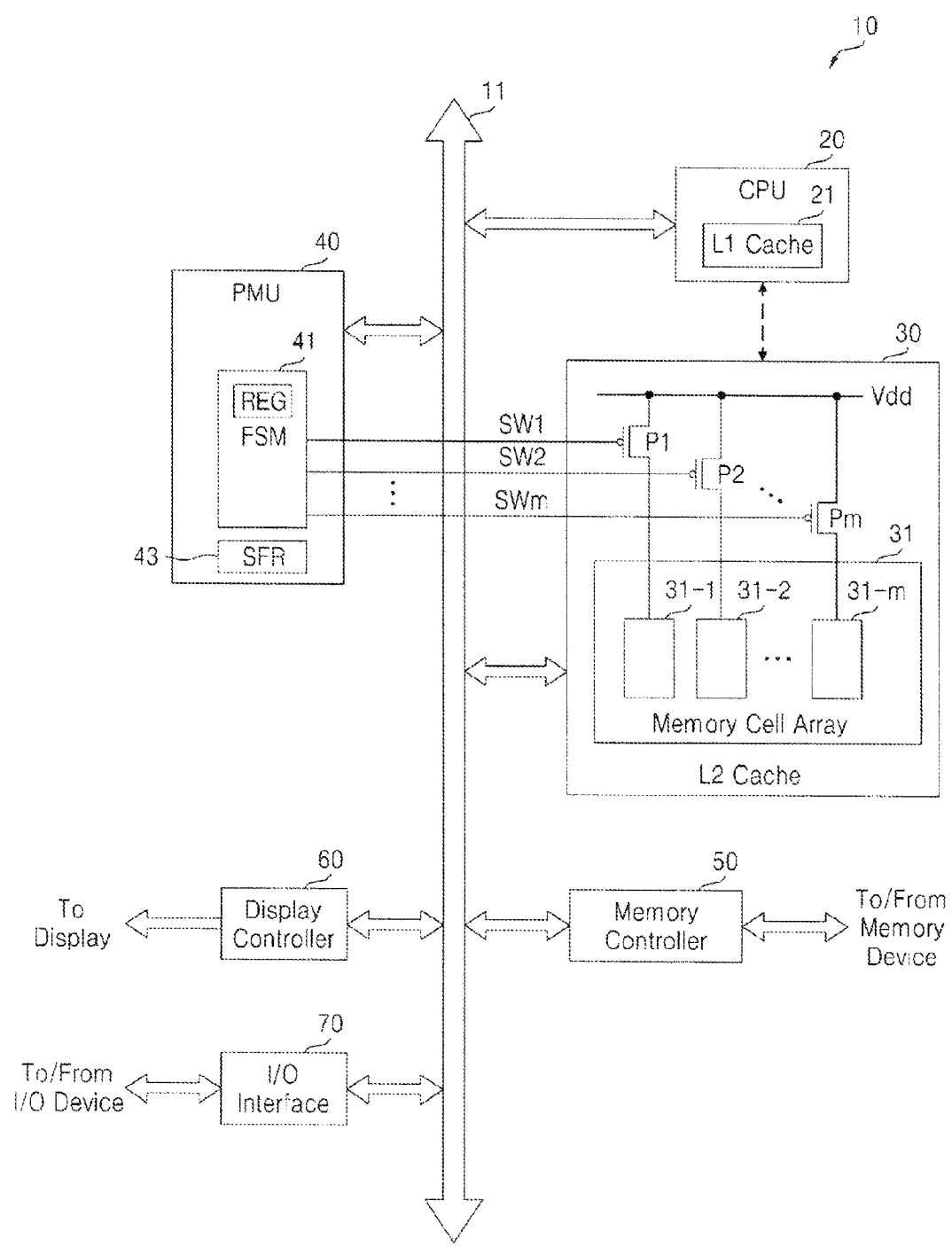
FIG. 1 is a block diagram of a data processing system according to an example embodiment of the present inventive concepts.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a data processing system according to an example embodiment of the present inventive concepts. Referring to FIG. 1, a data processing system 10 includes a central processing unit (CPU) 20, a level-2 (L2) cache memory 30, a power management unit (PMU) 40, a memory controller 50, a display controller 60, and an input/output interface 70.

The data processing system 10 may be embodied, for example, in an integrated circuit (IC), a system-on chip (SoC), a processor or an integrated multimedia processor. Each element 20, 30, 40, 50, 60 and 70 may communicate with each other through a bus 11.

The CPU 20 which may include at least one CPU core may control a whole operation of the data processing system 10. For example, the CPU 20 may include at least one level-1 (L1) cache memory 21.

A level-2 (L2) cache memory 30 includes switches P1, P2, ..., Pm, where m is a natural number, and a memory cell array 31. For example, the L2 cache memory 30 may perform a communication with the CPU 20 directly or through a bus 11. Each of the switches P1, P2, ..., Pm may be embodied, for example, in a PMOS transistor or an NMOS transistor.

The memory cell array 31 may be defined or partitioned as a plurality of portions 31-1, 31-2, ..., 31-m. Each of the plurality of portions 31-1, 31-2, ..., 31-m may be called a memory bank or a memory block, and may perform a write operation or a read operation independently. For example, each of the plurality of portions 31-1, 31-2, ..., 31-m includes memory cells for storing data.

Each of switches P1, P2, ..., Pm embedded or implemented in the L2 cache memory 30 is connected between a power line supplying a voltage Vdd and each of the plurality of portions 31-1, 31-2, ..., 31-m.

Each of the switches P1, P2, ..., Pm may supply a voltage Vdd to each of the plurality of portions 31-1, 31-2, ..., 31-m in response to each of switching signals SW1, SW2, ... SWm. For example, each of the switches P1, P2, ..., Pm may supply or interrupt (or block) a voltage Vdd to or from each of the plurality of portions 31-1, 31-2, ..., 31-m at the same time. In addition, each of the switches P1, P2, ..., Pm may independently supply or interrupt (or block) a voltage Vdd to or from each of the plurality of portions 31-1, 31-2, ..., 31-m. Accordingly, a voltage Vdd may be selectively supplied or interrupted to each of the plurality of portions 31-1, 31-2, ..., 31-m when needed, thereby reducing power consumption of the L2 cache memory 30.

The PMU 40 may generate control signals, i.e., switching signals SW1, SW2, ..., SWm, under the control of the CPU 20. For example, the PMU 40 may include a finite state machine (FSM) 41. The FSM 41 may be embodied, for example, in a circuit, logic, a code or a combination of these.

The CPU 20 may analyze a state of each of the plurality of portions 31-1, 31-2, ..., 31-m, e.g., whether it operates, whether it is accessed by the CPU 20, and/or whether it is accessed by the memory controller 50 or not, and write command data generated based on an analysis result in a configuration register REG of the PMU 40. The configuration register REG may be embodied, for example, inside or outside the FSM 41 as illustrated in FIG. 1.

The FSM 41 may generate switching signals SW1, SW2, ..., SWm based on the command data written in the configuration register REG. Each of the switches P1, P2, ..., Pm may perform a switching operation according to a level of each of the switching signals SW1, SW2, ..., SWm. For example, the FSM 41 may determine an activation order and/or the number of activations of the switching signals SW1, SW2, ..., SWm based on the command data written in the configuration register REG.

The PMU 40 may further include a programmable memory, e.g., a special function register (SFR) 43. For example, the SFR 43 may be used to define or partition the plurality of portions 31-1, 31-2, ..., 31-m. For example, according to data set in the SFR 43, the number or the capacity of memory banks included in each of the plurality of portions 31-1, 31-2, ..., 31-m may be determined. Without the SFR 43, the plurality of portions 31-1, 31-2, ..., 31-m may be defined or partitioned as default by a manufacturer. For example, each cache memory 21 and 30 may be embodied, for example, in a static random access memory (SRAM).

The memory controller 50 may execute a data communication with a memory device according to a control of the CPU 20. A display controller 60 may transmit display data to a display according to a control of the CPU 20. An input/output interface 70 may execute a data communication with an input/output device according to a control of the CPU 20.

Figure 2:
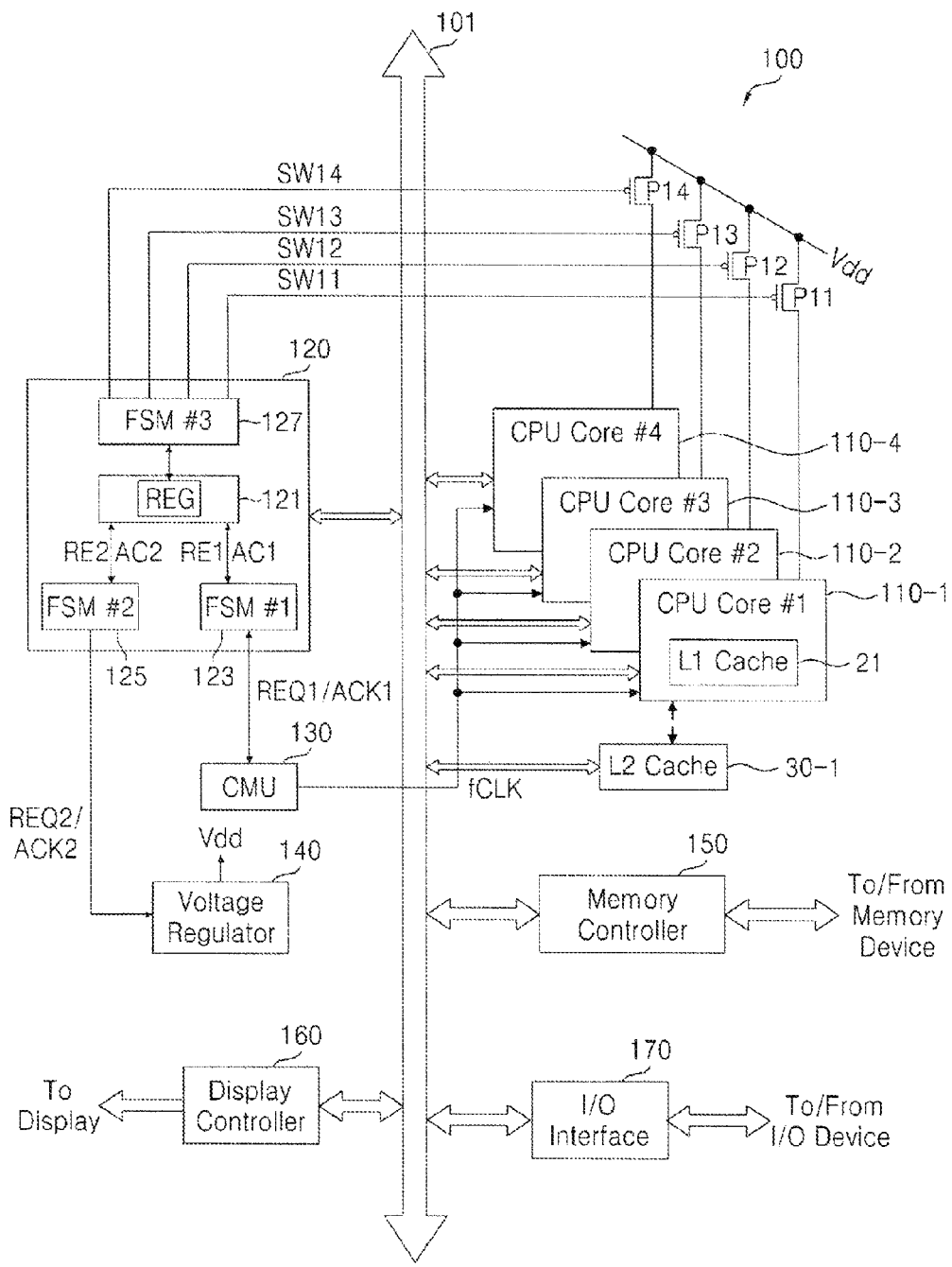
FIG. 2 is a block diagram of the data processing system according to another example embodiment of the present inventive concepts.
Figure 3:
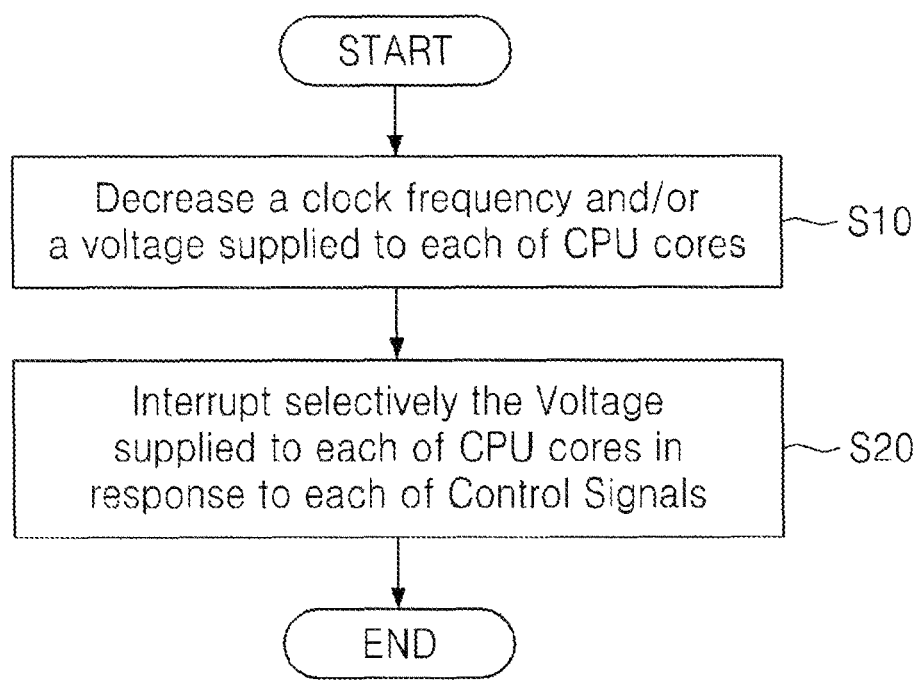
FIG. 3 is a flowchart for explaining an operation of the data processing system of FIG. 2.

FIG. 2 is a block diagram of the data processing system according to another example embodiment of the present inventive concepts. FIG. 3 is a flowchart for explaining an operation of the data processing system of FIG. 2.

Referring to FIG. 2, a data processing system 100 includes a plurality of switches P11 through P14, a plurality of CPU cores 110-1 through 110-4, a L2 cache memory 30-1, a PMU 120, a clock management unit (CMU) 130, a voltage regulator 140, a memory controller 150, a display controller 160, and a input/output interface 170.

The data processing system 100 may be embodied, for example, in an IC, a SoC, or an integrated multimedia processor. Each element 110-1 through 110-4, 30-1, and 120 through 170 may communicate with each other through the bus 101.

Each of the plurality of switches P11 through P14 is connected between a power line supplying a voltage Vdd and each of the plurality of CPU cores 110-1 through 110-4. For convenience of explanation, four CPU cores 110-1 through 110-4 and four switches P11 through P14 are illustrated in FIG. 2; however, a technical concept of the present invention is not restricted to the number of CPU cores and/or the number of switches. In addition, an identical voltage Vdd may be supplied to the four CPU cores 110-1 through 110-4, and each of different voltages may be supplied, respectively, to each of the four CPU cores 110-1 through 110-4 according to an example embodiment of the present inventive concepts.

Each of the switches P11 through P14 may supply a voltage Vdd to each of the plurality of CPU cores 110-1 through 110-4 in response to each of the switching signal SW 11 through SW 14, respectively. For example, each of the switches P11 through P14 may supply or interrupt a voltage Vdd to each of the plurality of CPU cores 110-1 through 110-4 at the same time. In addition, each of the plurality of switches P11 through P14 may supply or interrupt a voltage Vdd independently to each of the plurality of CPU cores 110-1 through 110-4. Accordingly, a voltage Vdd may be selectively supplied or interrupted to each of the plurality of CPU cores 110-1 through 110-4 when needed, thereby reducing power consumption of the data processing system 100.

A L2 cache memory 30-1 may communicate with at least one of the plurality of CPU cores 110-1 through 110-4 directly or through the bus 101.

Referring to FIGS. 1 and 2, when a structure of the L2 cache memory 30-1 is equal to a structure of the L2 cache memory 30 of FIG. 1, a third FSM 127 may further output switching signals SW1, SW2, . . . , SWm controlling an operation of switches P1, P2, . . . , Pm embedded or implemented in the L2 cache memory 30 besides switching signals SW 11 through SW14 controlling an operation of switches P11 through P14. That is, as explained referring to FIG. 1, each of the switches P1, P2, . . . , Pm may supply a voltage Vdd to each of the plurality of portions 31-1, 31-2, . . . , 31-m in response to each of the switching signals SW1, SW2, SWm output from the third FSM 127.

To control power consumption of the data processing system 100 including a plurality of CPU cores 110-1 through 110-4, at least one of a CMU 130 and a voltage regulator 140 may successively decrease at least one of a frequency of a clock signal (hereinafter, called a clock frequency fCLK) and a voltage Vdd which are supplied to each of the plurality of CPU cores 110-1 through 110-4 according to a control of the PMU 120 until reaching a reference value (S10).

Each of the plurality of CPU cores 110-1 through 110-4 may include at least one L1 cache memory 21. Each of the switches P11 through P14 may selectively interrupt/block a voltage Vdd supplied to/from each of the plurality of CPU cores 110-1 through 110-4 in response to each of control signals, e.g., the switching signals SW 11 through SW14 (S20).

The PMU 120 includes a central sequencer 121, a first FSM 123, a second FSM 125 and a third FSM 127. The central sequencer 121 may control whether or not each FSM 123, 125 and 127 operates or operation sequence thereof. The central sequencer 121 includes a configuration register REG.

One of the plurality of CPU cores 110-1 through 110-4 may determine an operation state, e.g., workload or temperature, of each of the plurality of CPU cores 110-1 through 110-4, and program command data for controlling power consumption of the data processing system 100 in the configuration register REG of the central sequencer 121 based on a determination result.

The central sequencer 121, when trying to reduce power consumption of the data processing system 100, may determine operation sequence or activation sequence of each FSM 123, 125 and 127 based on the command data written in the configuration register REG. For example, the central sequencer 121 may successively activate the first FSM 123, the second FSM 125 and the third FSM 127. Here, the central sequencer 121 and each FSM 123, 125 and 127 may execute a process for reducing power consumption through handshaking which transmits and receives a request signal and an acknowledge signal.

First of all, the central sequencer 121 transmits a request signal RE1 to the first FSM 123. The first FSM 123 transmits a first request signal REQ1 to a CMU 130 in response to the request signal RE1. The CMU 130 transmits a first acknowledge signal ACK1 to the first FSM 123 after scaling down or reducing a clock frequency fCLK based on the first request signal REQ1. The first FSM 123 transmits an acknowledge signal AC1 to the central sequencer 121 according to the first acknowledge signal ACK1.

The central sequencer 121 transmits a request signal RE2 to the second FSM 125 according to the acknowledge signal AC1. The second FSM 125 transmits a second request signal REQ2 to the voltage regulator 140 in response to the request signal RE2. The voltage regulator 140 transmits a second acknowledge signal ACK2 to the second FSM 125 after scaling down or reducing a voltage Vdd according to the second request signal REQ2. The second FSM 125 transmits an acknowledge signal AC2 to the central sequencer 121 based on the second acknowledge signal ACK2.

To decrease a clock frequency fCLK to a desirous frequency, a clock frequency scaling method and/or a voltage scaling method may be performed at least once or more.

Through a process described above, after the clock frequency fCLK reaches a reference frequency or a voltage Vdd reaches a reference voltage, the third FSM 127 may generate each of the switching signals SW 11 through SW 14 according to a control of the central sequencer 121. For example, according to each of the switching signals SW 11 through SW 14, a voltage Vdd supplied to each of the plurality of CPU cores 110-1 through 110-4 may be successively interrupted. Through such processes, i.e., a process for reducing a clock frequency fCLK and a process for selectively interrupting a voltage Vdd supplied to each CPU core 110-1 through 110-4 afterward, power consumption of the plurality of CPU cores 110-1 through 110-4 may be effectively reduced. Activation sequence of the switching signals SW 11 through SW14 may be determined by the third FSM 127.

Accordingly, the data processing system 100 may enter into a power save mode. That is, the data processing system 100, to enter into the power save mode, may scale down or decrease a clock frequency fCLK and/or a voltage Vdd to a reference value, and interrupt successively or selectively a voltage Vdd supplied to each of the plurality of CPU cores 110-1 through 110-4. According to an example embodiment, a voltage Vdd supplied to each of the plurality of CPU cores 110-1 through 110-4 may be interrupted at the same time.

The memory controller 150 may execute data communication with a memory device. The display controller 160 may transmit display data to a display. That is, the display controller 160 may transmit display data output from at least one of the plurality of CPU cores and/or the memory controller 150 to the display. The input/output interface 170 may execute a data communication with an input/output device.

Figure 4:
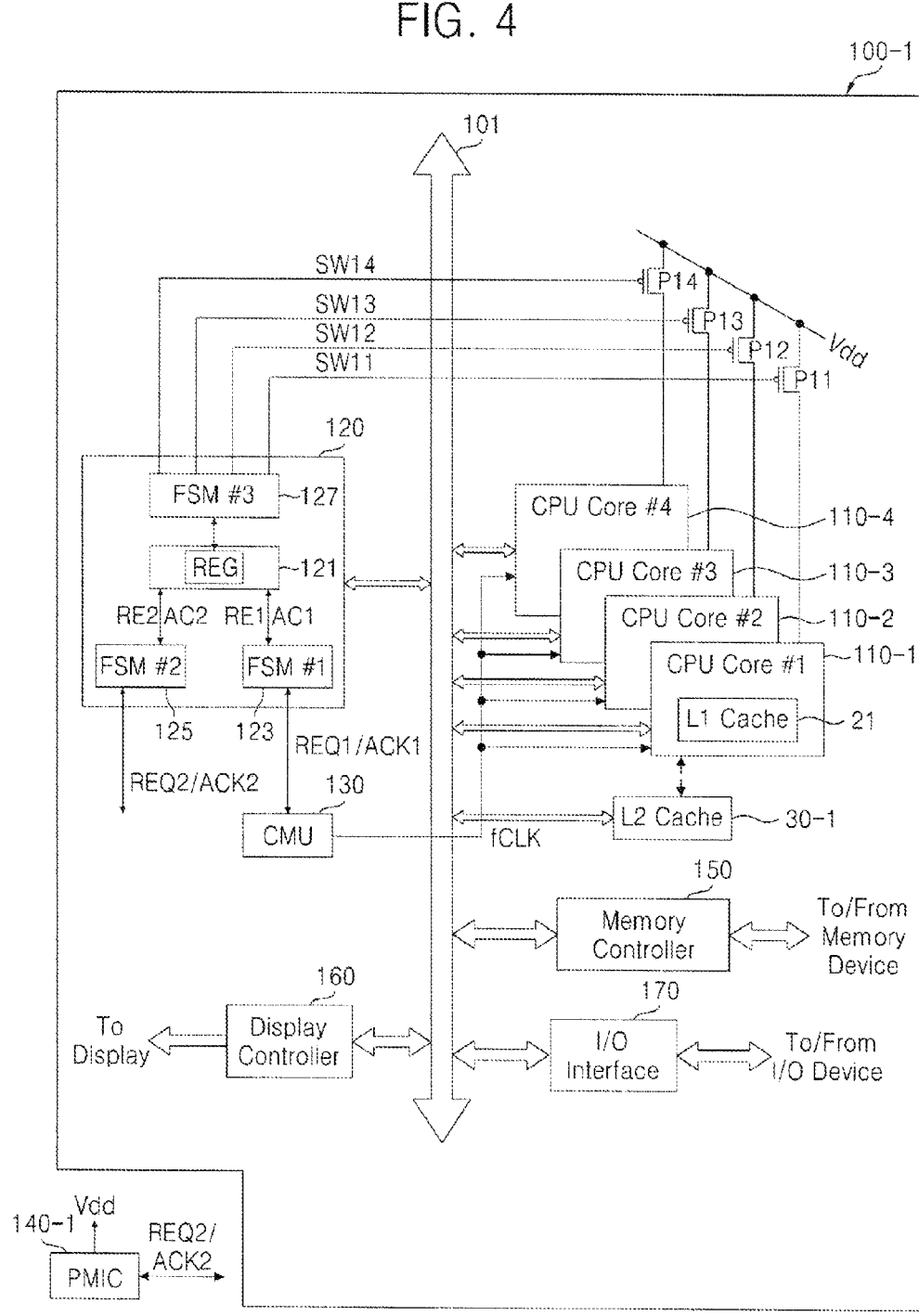
FIG. 4 is a block diagram of the data processing system according to still another example embodiment of the present inventive concepts.

FIG. 4 is a block diagram of the data processing system according to still another example embodiment of the present inventive concepts. Referring to FIGS. 2 and 4, a data processing system 100-1 does not have the voltage regulator 140 built in or embedded. That is, a voltage Vdd supplied to each CPU core 110-1 through 110-4 is generated by an additional voltage generation circuit, e.g., a power management IC (PMIC) 140-1, which is embodied outside the data processing system 100-1.

The PMIC 140-1 communicating signals REQ2 and ACK2 with the second FSM 125 through handshaking performs a function substantially the same as the voltage regulator 140. The data processing system 100-1 except for the PMIC 140-1 may be embodied, for example, in an IC, a SoC, a processor or an integrated multimedia processor.

Figure 5:
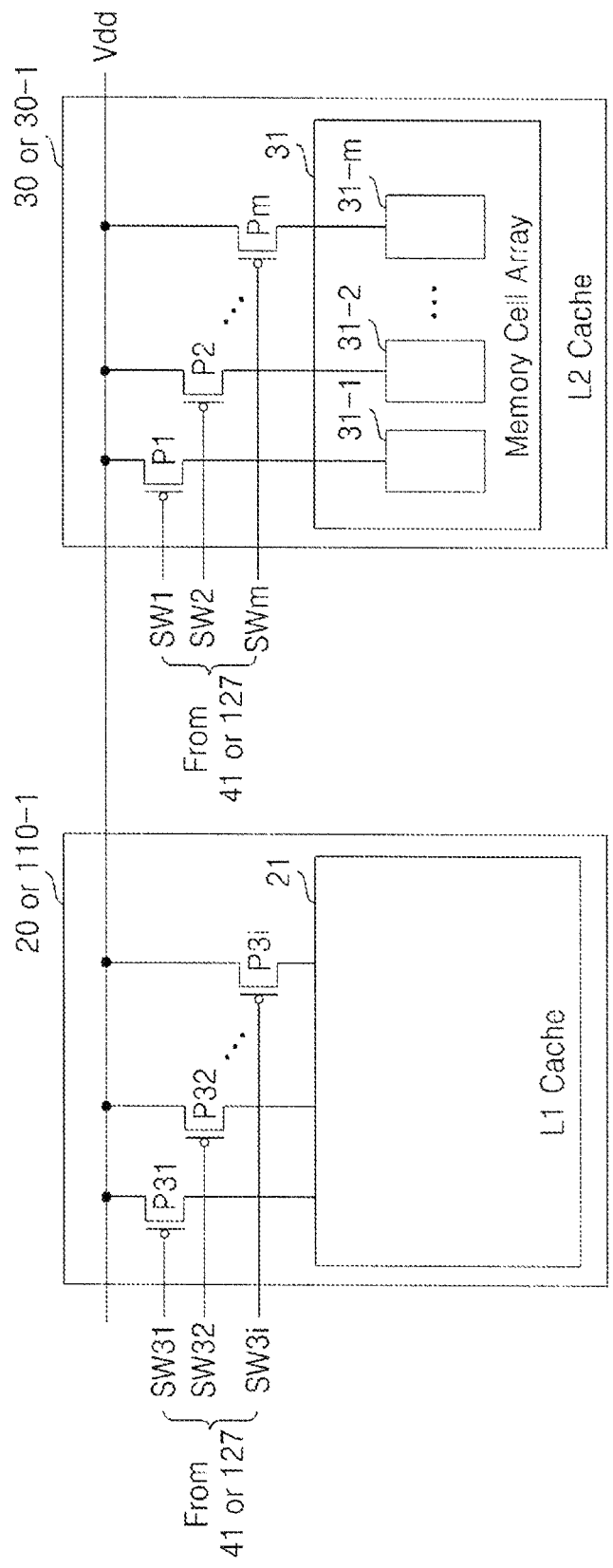
FIG. 5 is a circuit diagram of an L1 cache memory having a power gating structure and an L2 cache memory having a power gating structure.

FIG. 5 is a circuit diagram of an L1 cache memory having a power gating structure and an L2 cache memory having a power gating structure.

Referring to FIGS. 1, 2, 4 and 5, the CPU 20 or the CPU core 110-1 includes switches P31, P32, . . . , P3i (i is a natural number) and an L1 cache memory 21. Each of the switches P31, P32, . . . , P3i is connected between a power line supplying a voltage Vdd and the L1 cache memory 21. Each of the switches P31, P32, . . . , P3i is switched in response to each of switching signals SW31 through SW3i output from a FSM 41 or 127. As illustrated in FIG. 5, each of the switches P31, P32, . . . , P3i is embodied outside the L1 cache memory 21.

A L2 cache memory 30 or 30-1 includes switches P1, P2, ..., Pm and the memory cell array 31. Each of the switches P1, P2, ..., Pm is switched in response to each of switching signals SW1, SW2, ..., SWm output from the FSM 41 or 127. As illustrated in FIGS. 1 and 5, each of the switches P1, P2, ..., Pm is embodied inside the L2 cache memory 30 or 30-1.

Figure 6:
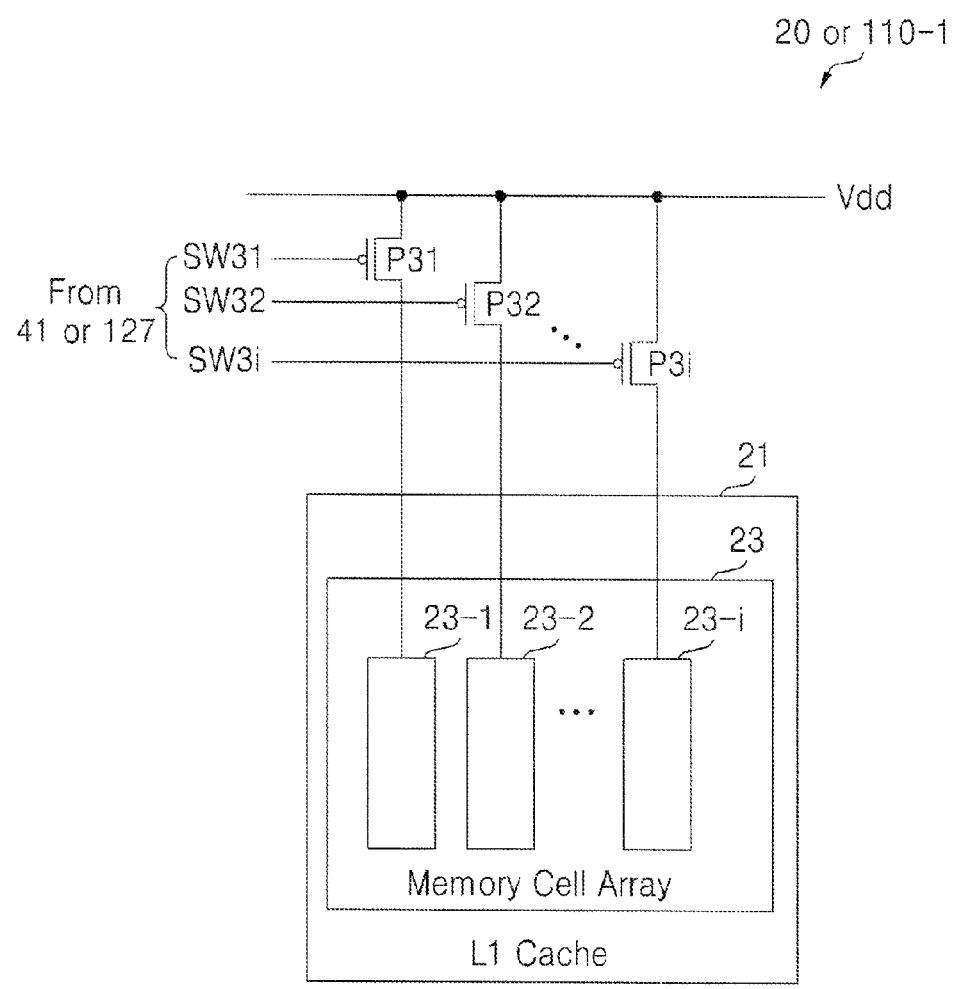
FIG. 6 is a central processing unit (CPU) including an L1 cache memory including a plurality of portions.

FIG. 6 is a CPU including an L1 cache memory including a plurality of portions. Referring to FIGS. 1, 2, 4 and 6, the CPU 20 or the CPU core 110-1 includes switches P31, P32, ..., P3i and the L1 cache memory 21. According to an example embodiment of the inventive concepts, a structure of each CPU core 110-1 through 110-4 may be identical to each other. Thus, for convenience of explanation, only a structure of the CPU core 110-1 is illustrated in FIGS. 5 and 6.

The L1 cache memory 21 includes a memory cell array 23 which may be defined or partitioned as a plurality of portions 23-1, 23-2, ..., 23-i. Each of the plurality of portions 23-1, 23-2, ..., 23-i may be called a memory bank or a memory block, and may perform a write operation or a read operation independently. Each capacity of the plurality of portions 23-1, 23-2, ..., 23-i may be set to default and adjusted according to data programmed in a programmable memory.

Each of the switches P31, P32, ..., P3i is connected between a power line supplying a voltage Vdd and each of the plurality of portions 23-1, 23-2, ..., and 23-i. Each of the switches P31, P32, ..., P3i may supply a voltage Vdd to each of the plurality of portions 23-1, 23-2, ..., 23-i in response to each of switching signals SW31, SW32, ..., SW3i.

As described above, each of the plurality of portions 23-1, 23-2, ..., 23-i may be defined or partitioned according to data programmed in a programmable memory, e.g., a SFR (not shown), embodied inside or outside the PMU 120. According to data set in the SFR, the number of memory banks included in each of the plurality of portions 23-1, 23-2, ..., 23-i may be determined.

Figure 7:
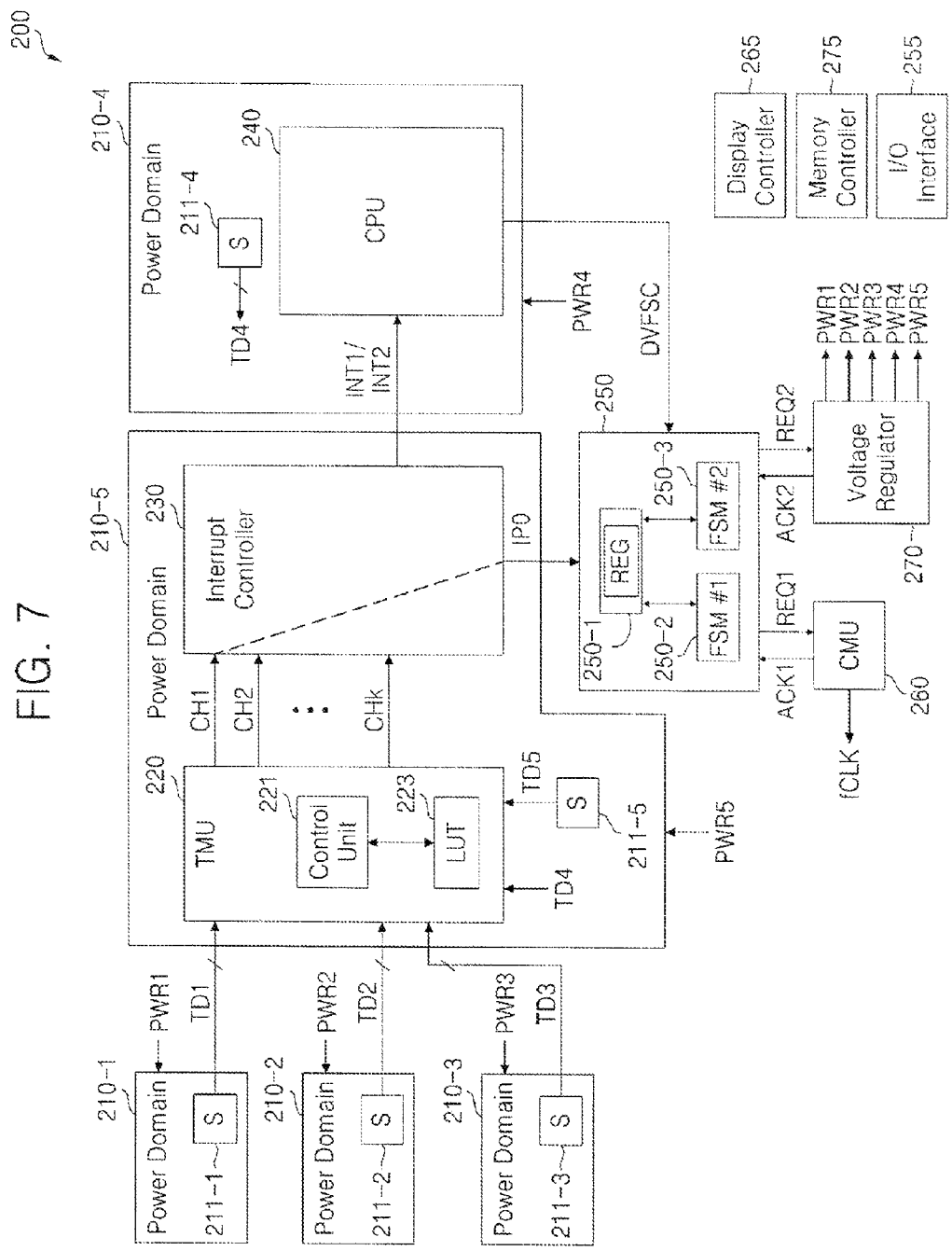
FIG. 7 is a block diagram of the data processing system according to still another example embodiment of the present inventive concepts.
Figure 8:
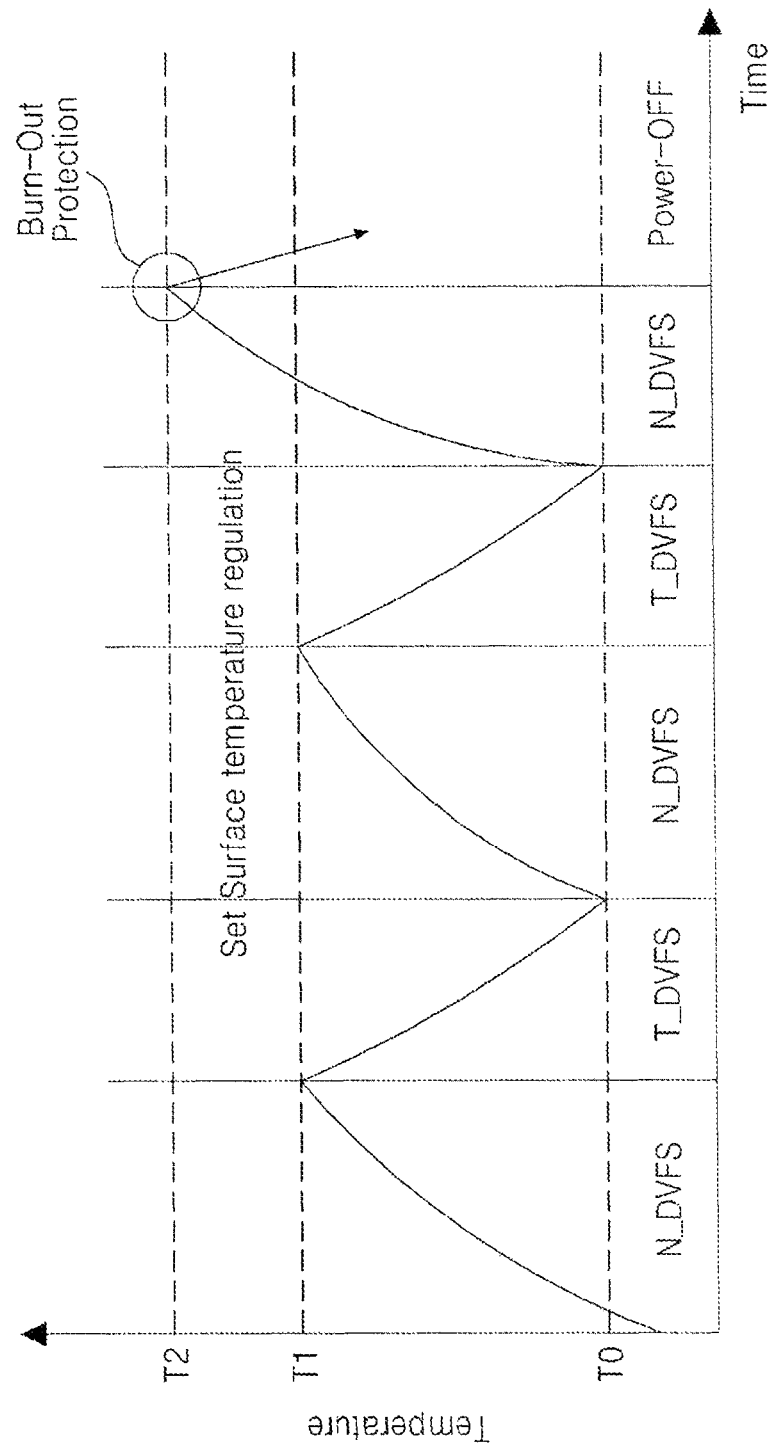
FIG. 8 is a conceptual diagram for explaining an operation of the data processing system illustrated in FIG. 7.

FIG. 7 is a block diagram of the data processing system according to still another example embodiment of the present inventive concepts. Referring to FIG. 7, a data processing system 200 includes a plurality of power domains 210-1 through 210-5.

Each voltage PWR1 through PWR5 supplied to each power domain 210-1 through 210-5 may be controlled simultaneously or independently. Each power domain 210-1 through 210-5 may include at least one thermal sensor S 211-1 through 211-5 and at least one intellectual property (IP).

The IP includes a CPU, each of CPU cores included in the CPU, a multi-format Codec (MFC), a video module (e.g., one or more of a camera interface, a Joint Photographic Experts Group (JPEG) processor, a video processor, or a mixer), a 3D graphic core, an audio system, a driver, a display driver, a volatile memory device, a non-volatile memory, a memory controller, or a cache memory.

At least one of the thermal sensors 211-1 through 211-5 may be a first thermal sensor which may measure accurate temperature, e.g., absolute temperature, and at least one of the rest sensors is a second thermal sensor which may measure relative temperature. Here, the second thermal sensor means a sensor which may measure temperature in a relative manner by using operation characteristics of an element changing according to temperature. For example, when the second thermal sensor is embodied in an oscillator having a frequency oscillating at f1 at room temperature, a frequency of the oscillator may increase from f1 to f2 as ambient temperature of the second thermal sensor increases. Accordingly, relative temperature may be measured based on thermal data corresponding to the frequency of the oscillator which is increased to f2.

Each thermal sensor 211-1 through 211-5 embodied in each power domain 210-1 through 210-5 may measure ambient temperature and output each thermal data TD1 through TD5 corresponding to a measurement result. For example, each thermal data TD1 through TD5 may include one or more bits.

A thermal management unit TMU 220 may receive and analyze each thermal data TD1 through TD5, and transmit analyzed (or analysis) data corresponding to an analyzing result to an interrupt controller 230 through a corresponding channel among a plurality of channels CH1 through CHk, where k is a natural number.

A control unit 221 of the TMU 220 may generate analyzing data based on each thermal data TD1 through TD5 and data stored in a look-up table (LUT) 223. For example, the control unit 221 of the TMU 220 may calculate an average value or a maximum value of thermal data TD1 through TD5, and generate analyzing data based on a calculated value and data stored in the LUT 223. For example, when each thermal data TD1 through TD5 is 8 bit, each temperature data corresponding to each bit string (from 00000000 to 11111111) may be stored in the LUT 223. As described above, each bit string may indicate an average value or a maximum value.

The data processing system 200 may perform a set surface temperature regulation method between a first temperature T0 and a second temperature T1. Here, the set surface temperature may mean surface temperature of the IC, the SoC, or the processor when the data processing system 200 is embodied in the IC, the SoC or the processor.

When each voltage PWR1 through PWR5 and a clock frequency fCLK are supplied to the data processing system 200, the set surface temperature gets increased. Here, the data processing system 200 performs dynamic voltage frequency scaling (DVFS) to regulate the set surface temperature between the first temperature T0 and the second temperature T1.

First of all, a first mode N_DVFS where the set surface temperature is regulated from the first temperature T0 to the second temperature is exemplarily explained as follows. Each thermal data TD1 through TD5 output from each thermal sensor 211-1 through 211-5 embodied in each power domain 210-1 through 210-5 is transmitted to a control unit 221 of the TMU 220.

The TMU 220 analyze each thermal data TD1 through TD5 referring to the LUT 223 and transmits analyzed data corresponding to a analyzing result to the interrupt controller 230 through a $k^{th}$ channel CHk. The interrupt controller 230 transmits an interrupt signal INT1 to a CPU 240.

The CPU 240 analyzes an interrupt signal INT1, determines whether to scale, e.g., scale up, a voltage and/or a frequency of one of the power domains 210-1 through 210-5 based on an analyzing result, and programs a scaling command DVFSC corresponding to a determination result in a configuration register REG of a central sequencer 250-1 of the PMU 250.

For example, when increasing a clock frequency fCLK supplied to a fourth power domain 210-4 among the power domains 210-1 through 210-5, the interrupt controller 230 may transmit an interrupt signal INT1 to the CPU 240 through a $k^{th}$ channel CHk. The CPU 240 programs a scaling command DVFSC for decreasing a voltage and a clock frequency supplied to the fourth power domain 210-4 based on the interrupt signal INT1 in the configuration register REG of the central sequencer 250-1 of the PMU 250.

The central sequencer 250-1 may first control a second FSM 250-3 related to a voltage control and control a first FSM 250-2 related to a clock frequency control based on a scaling command programmed in the configuration register REG.

Under the control of the central sequencer 250-1, the second FSM 250-3 transmits a second request command REQ2 to the voltage regulator 270. The voltage regulator 270 transmits a second acknowledge signal ACK2 to the second FSM 250-3 after increasing a voltage PWR4 supplied to the fourth power domain 210-4 among the voltages PWR1 through PWR5 to a fixed voltage step according to the second request command REQ2. The second FSM 250-3 transmits an acknowledge signal to the central sequencer 250-1 according to the second acknowledge signal ACK2.

The central sequencer 250-1 transmits a first request command REQ1 to the CMU 260 according to the acknowledge signal. The CMU 260 increases a clock frequency fCLK to a fixed frequency step in response to the first request command REQ1. Accordingly, a clock frequency fCLK supplied to the fourth power domain 210-4 is increased.

A process for increasing a voltage Vdd and a clock frequency fCLK in dynamic voltage/frequency scaling is performed at least once or more. A second mode T_DVFS where set surface temperature is regulated from the second temperature T1 to the first temperature T0 is exemplarily explained as follows.

Each thermal data TD1 through TD5 output from each thermal sensor 211-1 through 211-5 embodied in each power domain 210-1 through 210-5 is transmitted to the control unit 221 of the TMU 220.

The TMU 220 analyzes each thermal data TD1 through TD5 referring to the LUT 223 and transmits analyzed data corresponding to an analyzing result to the interrupt controller 230 through a second channel CH2. The interrupt controller 230 transmits an interrupt signal INT2 to the CPU 240.

The CPU 240 analyzes an interrupt signal INT2, determines whether to scale, e.g., scale down, a voltage and/or a frequency of one of the power domains 210-1 through 210-5 based on an analyzing result, and programs a scaling command DVFSC corresponding to a determination result in a configuration register REG of the central sequencer 250-1 of the PMU 250.

For example, when decreasing a clock frequency fCLK supplied to the fourth power domain 210-4, the central sequencer 250-1 may first control the first FSM 250-2 related to a clock frequency control based on a scaling command programmed in the configuration register REG, and control the second FSM 250-3 related to a voltage control.

Under the control of the central sequencer 250-1, the first FSM 250-2 transmits a first request command REQ1 to the CMU 260. The CMU 260 decreases a clock frequency fCLK to a fixed frequency step based on the first request command REQ1. Accordingly, a clock frequency fCLK supplied to the fourth power domain 210-4 is decreased.

After the clock frequency fCLK is decreased, the CMU 260 transmits a first acknowledge signal ACK1 to the first FSM 250-2. Afterwards, the first FSM 250-2 transmits an acknowledge signal to the central sequencer 250-1 based on the first acknowledge signal ACK1.

The central sequencer 250-1 transmits a second request command REQ2 to the voltage regulator 270 based on the acknowledge signal. The voltage regulator 270 transmits a second acknowledge signal ACK2 to the second FSM 250-3 after decreasing a voltage PWR4 supplied to the fourth power domain 210-4 among the voltages PWR1 through PWR5 to a fixed voltage step based on the second request command REQ2. The second FSM 250-3 transmits an acknowledge signal to the central sequencer 250-1 based on the second acknowledge signal ACK2. A process of decreasing a voltage Vdd and a clock frequency fCLK in dynamic voltage/frequency scaling is performed at least once.

An operation of the data processing system 200 when the set surface temperature is more than a third temperature T2, i.e., in a burn-out protection mode, is explained as follows.

For example, temperature of the fourth power domain 210-4 increases more than the third temperature T2, the TMU 220 generates analyzed data based on thermal data TD4 output from a thermal sensor 211-4 embodied in the fourth power domain 210-4 and the LUT 223, and transmits generated analyzed data to the interrupt controller 230 through a first channel CH1.

The interrupt controller 230 programs an interrupt signal IPO in a configuration register REG of the central sequencer 250-1 of the PMU 250 based on analyzed data input through the first channel CH1. The central sequencer 250-1 transmits a second request signal REQ2 to the voltage regulator 270 based on the interrupt signal IPO programmed in the configuration register REG.

To prevent burn-out of the data processing system 200, the voltage regulator 270 immediately interrupts a voltage PWR4 supplied to the fourth power domain 210-4 based on the second request signal REQ2.

According to an example embodiment, the voltage regulator 270 may immediately interrupt not only a voltage PWR4 supplied to the fourth power domain 210-4 but also each voltage PWR1, PWR2, PWR3 and PWR5 supplied to different power domains 210-1, 210-2, 210-3 and 210-5 based on the second request signal REQ2 in order to prevent burn-out of the data processing system 200.

As described above, the interrupt controller 230 transmits an interrupt signal IPO directly to the PMU 250 instead of transmitting to the CPU 240 to prevent burn-out of the data processing system 200. Accordingly, temperature of the data processing system 200 may decrease rapidly. Channels CH1, CH2, and CHk where analyzed data are transmitted are not more than exemplification for convenience of explanation.

Figure 9:
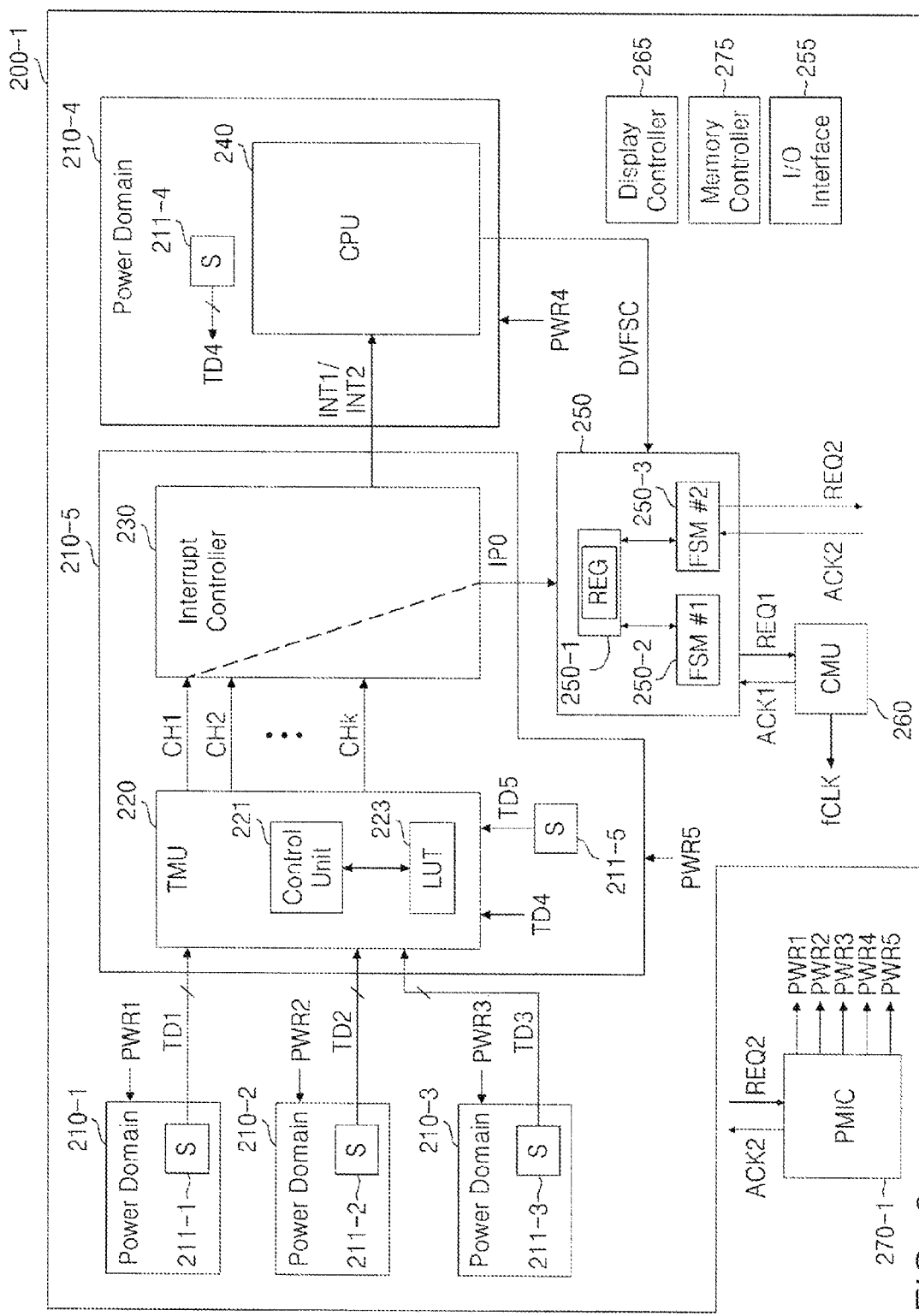
FIG. 9 is a block diagram of the data processing system according to still another example embodiment of the present inventive concepts.

FIG. 9 is a block diagram of the data processing system according to still another example embodiment of the present inventive concepts. Referring to FIGS. 7 and 9, a data processing system 200-1 does not have the voltage regulator 270 built-in or embedded. That is, a voltage Vdd is generated by an additional voltage generation circuit, e.g., a PMIC 270-1, embodied outside the data processing system 200-1.

The PMIC 270-1 communicating signals REQ2 and ACK2 with the second FSM 250-3 through handshaking performs substantially the same function as the voltage regulator 270. The data processing system 200-1 except for the PMIC 270-1 may be embodied, for example, in an IC, a SoC, a processor or an integrated multimedia processor.

As explained referring to FIGS. 2 and 7, a dynamic voltage/frequency scaling control circuit includes a CMU 130 or 260 and a voltage regulator 140 or 270. The CMU 130 or 260 and the voltage regulator 140 or 270 may be embodied, for example, in an IC, a SoC or a processor. However, as explained referring to FIGS. 4 and 9, the dynamic voltage/frequency scaling control circuit includes the CMU 130 or 260 and a voltage generation circuit 140-1 or 270-1. The CMU 130 or 260 and the voltage generation circuit 140-1 or 270-1 may be embodied, for example, in different chips.

Figure 10:
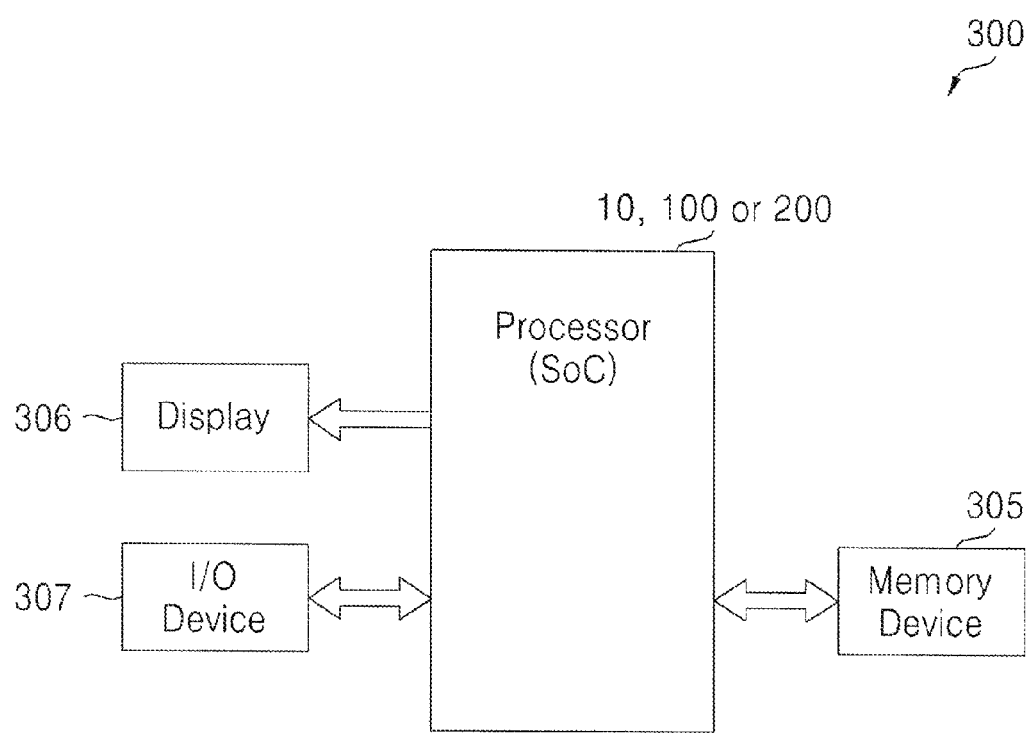
FIG. 10 is a block diagram of a data processing device including the data processing system illustrated in FIG. 1, 2 or 7.

FIG. 10 is a block diagram of a data processing device including the data processing system illustrated in FIG. 1, 2 or 7. A data processing device 300 includes a data processing system 10, 100 or 200, a memory device 305, a display 306, and an input/output device 307. The data processing device 300 may be embodied, for example, in a portable device such as a mobile phone, a smart phone, or a tablet PC.

As described above, the data processing system 10, 100 or 200 may be embodied, for example, in an IC, a SoC, a processor or an integrated multimedia processor.

The memory device 305 may communicate with a memory controller 50, 150 or 275. The display 306 may communicate with a display controller 60, 160 or 265. The input/output device 307 may communicate with an input/output interface 70, 170 or 255. For example, the input/output device 307 may be embodied, for example, in a pointing device such as a touch pad, a stylus or a virtual keyboard.

Figure 11:
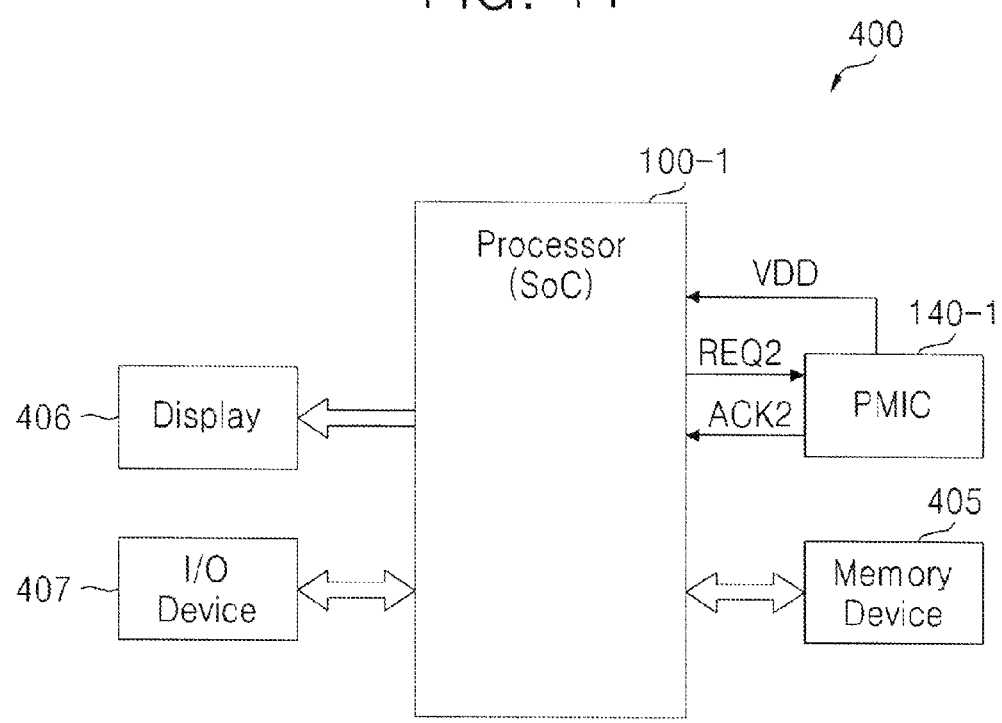
FIG. 11 is a block diagram of the data processing device including the data processing system of FIG. 4.

FIG. 11 is a block diagram of a data processing device including the data processing system of FIG. 4. Referring to FIGS. 4 and 11, a data processing system 400 includes a data processing system 100-1, a voltage generation circuit, e.g., the PMIC 140-1, a memory device 405, a display 406, and an input/output device 407.

The data processing device 400 may be embodied, for example, in a portable device such as a mobile phone, a smart phone or a tablet PC. As described above, the data processing system 100-1 may be embodied, for example, in an IC, a SoC, a processor or an integrated multimedia processor.

The memory device 405 may communicate with the memory controller 150. The input/output device 407 may communicate with an input/output interface 170. For example, the input/output device 307 may be embodied, for example, in the said pointing device.

Figure 12:
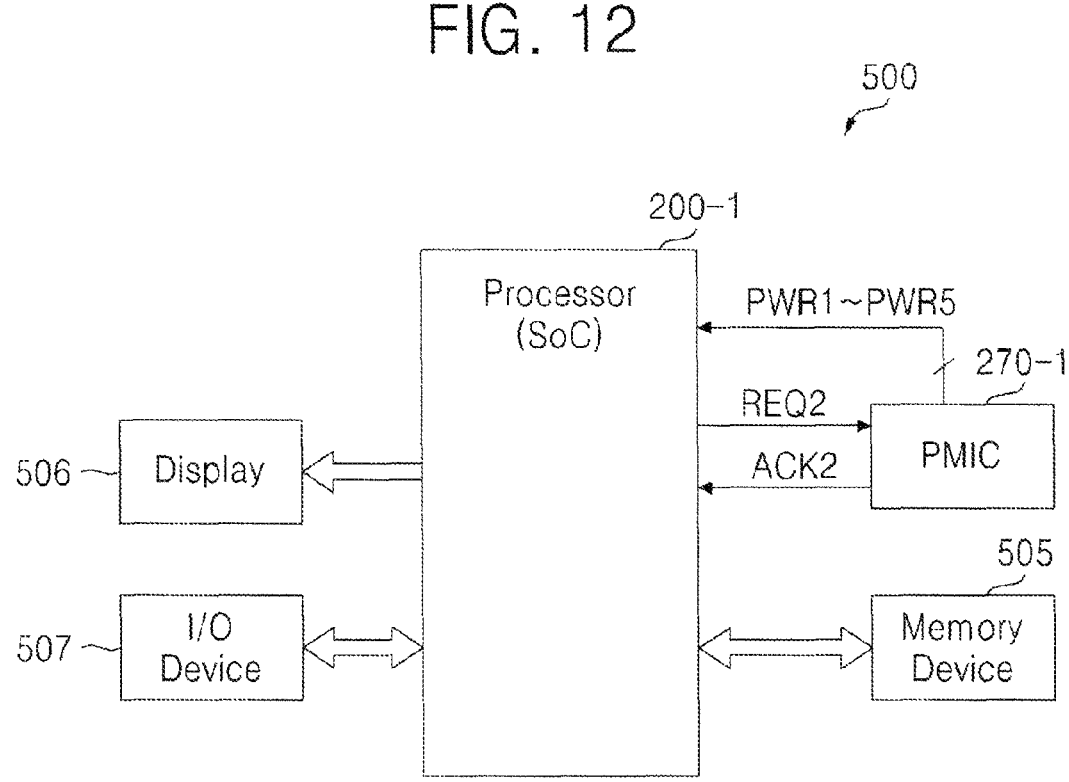
FIG. 12 is a block diagram of the data processing device including the data processing system of FIG. 9.

FIG. 12 is a block diagram of a data processing device including the data processing system of FIG. 9. Referring to FIGS. 9 and 12, a data processing device 500 includes a data processing system 200-1, a voltage generation circuit, e.g., the PMIC 270-1, a memory device 505, a display 506 and an input/output device 507.

The data processing device 500 may be embodied, for example, in a portable device such as a mobile phone, a smart phone or a tablet PC. As described above, the data processing system 200-1 may be embodied, for example, in an IC, a SoC, a processor or an integrated multimedia processor.

The PMIC 270-1 may supply each voltage PWR1 through PWR5 to each power domain 210-1 through 210-5. The memory device 505 may communicate with the memory controller 275. The display 506 may communicate with the display controller 265. The input/output device 507 may communicate with the input/output interface 255. For example, the input/output device 307 may be embodied, for example, in the said pointing device.

As explained referring to FIGS. 10, 11, and 12, a display 306, 406, or 506 may display data processed by each data processing system 10, 100, 100-1, 200 or 200-1 according to a control of each display controller 60, 160 or 265. Each display controller 60, 160 or 265 may perform a function of a display driver.

A method according to an example embodiment of the present inventive concepts and devices performing the method may selectively interrupt a voltage supplied to an unnecessary portion, thereby efficiently reducing a power consumed in the devices. In addition, through a method of controlling temperature inside a mobile system, the method and the devices may prevent burn-out of the mobile system with less overhead and retain surface temperature of the mobile system at an appropriate level.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A processor, comprising:
   a thermal management unit configured to analyze a first thermal data output from thermal sensors, generate a first analysis data, select a first channel of a plurality of channels based on the first analysis data and transmit the first analysis data through the first channel;
   an interrupt controller configured to generate a first interrupt signal based on the first analysis data received from the first channel;
   a power management unit configured to generate a first voltage control signal in response to the first interrupt signal; and
   a voltage supply circuit configured to interrupt a voltage supplied to at least one target power domain in response to the first voltage control signal,
   wherein the plurality of channels is configured to connect between the thermal management unit and the interrupt controller,
   wherein the interrupt controller is configured to transmit the first interrupt signal to a CPU, if the first thermal data indicates a temperature that is not above a first threshold temperature, and
   wherein the interrupt controller is configured to transmit a third interrupt signal directly to the power management unit instead of transmitting the first interrupt signal to the CPU, if the first thermal data indicates a temperature that is above the first threshold temperature.

2. The processor of claim 1, wherein the thermal sensors include,
   a first sensor configured to measure absolute temperature inside the processor; and
   a second sensor configured to measure a relative temperature inside the processor.

3. The processor of claim 1, wherein the thermal management unit is configured to generate the first analysis data based on the thermal data and data stored in a look-up table.

4. The processor of claim 1, further comprising:
   a central processing unit (CPU) configured to generate a scaling command in response to a second interrupt signal; and
   a clock management unit configured to generate a clock signal,
   wherein the thermal management unit is configured to analyze a second thermal data output from the thermal sensors, generate a second analysis data, select a second channel of the plurality of channels based on the second analysis data and transmit the second analysis data through the second channel,
   wherein the interrupt controller is configured to generate the second interrupt signal based on the second analysis data received from the second channel,
   wherein the power management unit is configured to generate a second voltage control signal and a clock control signal in response to the scaling command,
   wherein the voltage supply circuit is configured to change the voltage in response to the second voltage control signal, and the clock management unit is configured to change a frequency of the clock signal in response to the clock control signal.

5. A portable device, comprising:
   the processor of claim 1; and
   a display configured to display data processed by the processor.

6. The portable device of claim 5, wherein the thermal sensors include,
   a first sensor configured to measure absolute temperature inside the processor; and
   a second sensor configured to measure relative temperature inside the processor.

7. The portable device of claim 5, wherein the thermal management unit is configured to generate the first analysis data based on the first thermal data and data stored in a look-up table.

8. The portable device of claim 5, further comprising:
   a central processing unit (CPU) configured to generate a scaling command in response to a second interrupt signal; and
   a clock management unit configured to generate a clock signal,
   wherein the thermal management unit configured to analyze a second thermal data output from the thermal sensors, generate a second analysis data, select a second channel of the plurality of channels based on the second analysis data and transmit the second analysis data through the second channel,
   wherein the interrupt controller is configured to generate the second interrupt signal based on the second analysis data received from the second channel,
   wherein the power management unit is configured to generate a second voltage control signal and a clock control signal in response to the scaling command,
   wherein the voltage supply circuit is configured to change the voltage in response to the second voltage control signal, and the clock management unit is configured to change a frequency of the clock signal in response to the clock control signal.

9. The portable device of claim 5, wherein the portable device is a smart phone or a tablet personal computer (PC).

* * * * *